R. E. TUPPER.
CURTAIN LIGHT.
APPLICATION FILED FEB. 5, 1920.
Reissued Aug. 2, 1921. 15,173.
*Fig. 1*
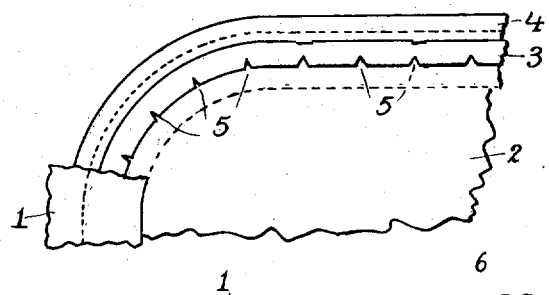
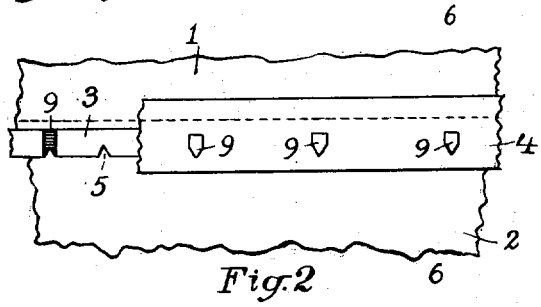
*Fig. 2*
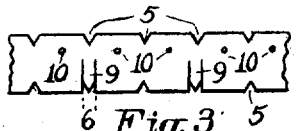
*Fig. 3*
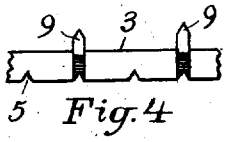
*Fig. 4*
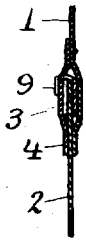
*Fig. 6*
*Fig. 7*
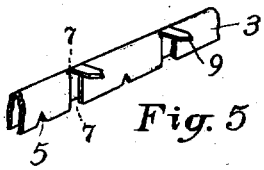
*Fig. 5*
*Inventor,*
*Russell E. Tupper;*
*By* A. B. Lepham,
*Attorney.*

UNITED STATES PATENT OFFICE.

RUSSELL E. TUPPER, OF COCHITUATE, MASSACHUSETTS.

CURTAIN-LIGHT.

15,173. Specification of Reissued Letters Patent. Reissued Aug. 2, 1921.

Original No. 1,312,087, dated August 5, 1919, Serial No. 263,205, filed November 19, 1918. Application for reissue filed February 5, 1920. Serial No. 356,442.

*To all whom it may concern:*

Be it known that I, RUSSELL E. TUPPER, a citizen of the United States, and a resident of Cochituate, in the county of Middlesex and Commonwealth of Massachusetts, have invented certain new and useful Improvements in Curtain-Lights, of which the following is a full, clear, and exact specification.

The object of this invention is the construction of improved means for renewing injured and broken lights in automobile curtains and the like, whereby the repairing can be done by the owner or chauffeur of the car without sending the curtain away to an expert.

To this end, I provide a sheet metal device which can be clamped about the edges of a light and attached to the curtain by projecting spurs.

In the drawings forming part of this specification, Figure 1 is an elevation of a portion of a curtain showing a light attached thereto by my improved means. Fig. 2 is an elevation of parts of the same viewed from within the car. Fig. 3 is a face view of a section of the sheet metal device before it has been doubled on itself laterally. Fig. 4 is a view of the same after being doubled. Fig. 5 is a perspective view of the same. Fig. 6 is a section. Fig. 7 is a cross section on the line 7—7 in Fig. 5.

Referring to Fig. 2, the reference numeral 1 designates a portion of a curtain having an opening into which a new light 2 of celluloid or the like has been fitted; 3 is the attaching device, and 4 is the binding which is ordinarily stitched to the curtain and original light about the illuminating opening.

When the attaching device is made as a long strip, it has its edges given numerous V-shaped notches 5, as shown most clearly in Fig. 3, to enable it to be easily bent to fit a rounded outline, as shown in Fig. 1. In one edge, slits 6 are cut approximately to the bend 7, and the tongues 9 thus formed are sharpened to render easier their penetration in the fabric composing the binding 4. When this metal strip is ready for use, its fingers or spurs 9 are standing at right angles to its surface, as shown in Figs. 5 and 7.

Further, indentations 10 are impressed in the device, as shown in Fig. 3, in order to form projections 11 directed toward the other leaf of the device, as shown in Fig. 7, for the purpose of engaging the edges of the light 2 when introduced between the two members of the strip, and thereby to insure against withdrawal of the light.

In using this means of attachment, the stitches near the edge of the binding 4 by which the damaged light was originally held in place, are carefully cut in order to separate this edge of the binding from the light and the curtain. The old light being removed and the new sheet of transparent material having been cut to compose the light 2, the attaching means 3 is pressed over its edges and made to securely hold by a blow or two over the indentations 10 to force the projections 11 into the celluloid. Then the metal-inclosed edges of the light 2 are introduced between the binding 4 and the curtain 1, and the spurs 9 are forced through the binding and bent flat against the surface of the binding, as shown in Figs. 2 and 6.

All that now remains is to cement the inner edges of the binding and curtain to the contacting surfaces of the light, and the task is complete.

When a light thus inserted becomes injured, it is an easy thing to run a knife edge between the cemented surfaces; then to unbend the spurs 9; remove the light and its attaching strip; pry the two leaves of the latter apart to remove the damaged light, and to introduce and cement a fresh light in the manner already described.

Although I have shown the attaching device as a single long strip of sheet metal, it is evident that more than one length can be used on a light, the only thing essential being that at least one of the spurs 9 and one or two of the projections 11 shall be provided for each length or section.

It is readily seen that this device furnishes not only a convenient and neat means for replacing old lights with new, but it can be applied in the attachment of lights to curtains when originally manufactured.

What I claim is:

1. A clamping device for sheet material, comprising a section of sheet metal folded over upon itself to compose two spaced members, one of said members having a projection on its inner surface, and one member having a spur projecting therefrom, whereby sheet material can be clamped between said members and other sheet material can be held by said spur.

2. The combination with a fabric having an opening through it and a sheet to be attached over the opening, of an attaching device comprising a section of sheet metal folded over upon itself to compose two spaced members, one member having projections on its inner surface, and a member having a pointed spur projecting therefrom, said members having an edge of said sheet held between them by said projections, and said spur being thrust through and bent down upon said fabric.

3. A clamping strip composed of sheet metal folded over upon itself along a longitudinal line to form two spaced members having inward projections and outwardly projecting spurs, whereby sheet material can be clamped between said members, and other sheet material can be held by said spurs.

4. The combination with a fabric having an opening through it and a sheet to be attached over the opening, of a binding strip stitched to the fabric near its edge spaced from the edge of the opening, and a clamping strip composed of sheet metal folded over upon itself along a longitudinal line and inclosing the edges of the said sheet, the clamping strip having pointed projections for engaging said sheet and pointed spurs for engaging said binding, said strip being disposed between the binding and fabric and cemented therein.

5. The combination with a fabric having an opening through it and a sheet to be attached thereto over said opening, of a clamping strip composed of sheet metal folded over on itself along a longitudinal line and inclosing the edge of said sheet, and a binding strip stitched and cemented to the fabric about said opening with the clamping strip between, the outline of the opening being partially curved and the clamping strip having numerous notches in its edge to permit its being curved to correspond with the opening.

In testimony that I claim the foregoing invention, I have hereunto set my hand this 30 day of January, 1920.

RUSSELL E. TUPPER